United States Patent [19]

Masse et al.

[11] 4,312,049
[45] Jan. 19, 1982

[54] METHOD OF IDENTIFYING GAS, OIL AND WATER ZONES IN A SUBSURFACE FORMATION

[75] Inventors: Lucien Masse; W. Louis Medlin, both of Dallas; James H. Sexton, Duncanville, all of Tex.

[73] Assignee: Mobil Oil Corporation, New York, N.Y.

[21] Appl. No.: 88,888

[22] Filed: Oct. 29, 1979

[51] Int. Cl.³ ............................................... G01V 1/40
[52] U.S. Cl. .................................... 367/35; 367/86; 367/32; 181/105
[58] Field of Search .................... 367/25, 30, 86, 35, 367/32; 73/152; 181/102, 105

[56] References Cited

U.S. PATENT DOCUMENTS

| | | | |
|---|---|---|---|
| 3,268,858 | 8/1966 | Winter | 73/152 |
| 3,500,683 | 3/1970 | Hoyle | 73/152 |
| 3,512,407 | 5/1970 | Zill | 73/152 |
| 3,638,484 | 2/1972 | Tixier | 73/152 |
| 3,721,960 | 3/1973 | Tinch et al. | 73/152 |
| 3,896,668 | 7/1975 | Anderson et al. | 73/152 |

*Primary Examiner*—Howard A. Birmiel
*Attorney, Agent, or Firm*—C. A. Huggett; J. F. Powers, Jr.; F. J. Kowalski

[57] ABSTRACT

A method of logging a wellbore to identify oil, gas and water zones in a hydrocarbon-bearing formation that is characterized by acoustic velocities which are maximum when saturated with oil, minimum when saturated with water and intermediate when saturated with gas. The formation is logged with a sonic logging system utilizing a frequency within the range of 0.1 to 10 KHz and logged with a lithologic logging system to account for variations in lithology on the sonic log. Thereafter the sonic log is compared with the known acoustic velocity characteristic of the hydrocarbon-bearing formation to identify the oil, gas and water zones therein.

3 Claims, 2 Drawing Figures

METHOD OF IDENTIFYING GAS, OIL AND WATER ZONES IN A SUBSURFACE FORMATION

BACKGROUND OF THE INVENTION

This invention relates to a method of logging subsurface earth formations penetrated by a wellbore and more particularly to a method of identifying gas, oil and water zones in a subsurface formation having known acoustic characteristics.

Wellbores are conventionally logged to determine rock and fluid properties of subsurface formations that are traversed by the wellbore. Sonic logs, also referred to as acoustic logs, acoustic-velocity logs, and continuous velocity logs, are well logs of the travel time (transit time) for acoustic waves over a unit distance, and hence the reciprocal of the longitudinal wave (p-wave) velocity. Measurements are usually in microseconds per foot, though the log is normally displayed as velocity in feet per second versus depth. Such logs are used for porosity determinations as well as for furnishing geophysicists with velocity information for use in seismic interpretation. Other logs useful for determining porosity of subsurface formations are neutron logs and density logs.

In U.S. Pat. No. 4,131,875 there is described a method and apparatus for preferentially exciting and for extracting late arrivals at low frequencies in an acoustic investigation of a borehole. It is there pointed out that a transmitter spectrum whose frequencies extend with significant amplitudes down to about 500 Hz would be particularly desirable. Acoustic transmitters for producing sonic pulses containing low frequencies have been described in the art for investigating early arrivals, particularly in cased holes as is shown in U.S. Pat. No. 3,909,775. A low frequency transducer for generating acoustic energy above 75 db level for a bandwidth from 2.4 KHz to 9.6 KHz is described in U.S. Pat. No. 3,845,333.

There is published in THE OIL AND GAS JOURNAL, beginning with the May 15, 1978 issue, a series of articles entitled "Practical Log Analysis". In the fifteenth series, published in May 12, 1979 issue of THE OIL AND GAS JOURNAL, it is pointed out that basically three types of porosity logs are available: acoustic (sonic), neutrons, and density logging devices. As there noted, all porosity logs are primarily responsive to porosity but other formation characteristics influence the measurements. Various combinations of the three logging measurements can be used to determine specific lithologies, porosity, and, under certain circumstances, type and amount of fluid in the pore space.

The ninth series found in the Sept. 25, 1978 issue of THE OIL AND GAS JOURNAL, beginning at page 96, is entitled "Neutron Density Log As A Valuable Open Hole Porosity Tool". There it is said that the neutron density type logs are rapidly becoming the standard porosity device for open hole evaluation by wireline techniques. It is further pointed out that with the neutron density log one can obtain lithology, porosity, hydrocarbon types; locate shaley gas reservoirs; and serve as the basis for the advanced computer programs when combined with the basic resistivity devices.

SUMMARY OF THE INVENTION

This invention is directed to a method of logging a wellbore to identify hydrocarbon zones in a formation penetrated by the wellbore. First, there is identified a hydrocarbon-bearing formation which is characterized by an acoustic velocity which is maximum when the formation is saturated with oil, minimum when saturated with water, but not exceeding 90% water, and intermediate when saturated with gas. The hydrocarbon-bearing formation is logged with a sonic logging system that utilizes a frequency within the range of about 0.1 to 10 KHz to produce a sonic log. The hydrocarbon-bearing formation is also logged with a lithologic logging system to determine porosity and lithologic variations of the formation whereby the sonic log may be normalized by being corrected for porosity and lithology. Thereafter the sonic log is compared with the characterized acoustic velocity profile of the hydrocarbon-bearing formation to identify oil, gas and water zones therein.

DESCRIPTION OF THE PREFERRED EMBODIMENTS

Figure 1:
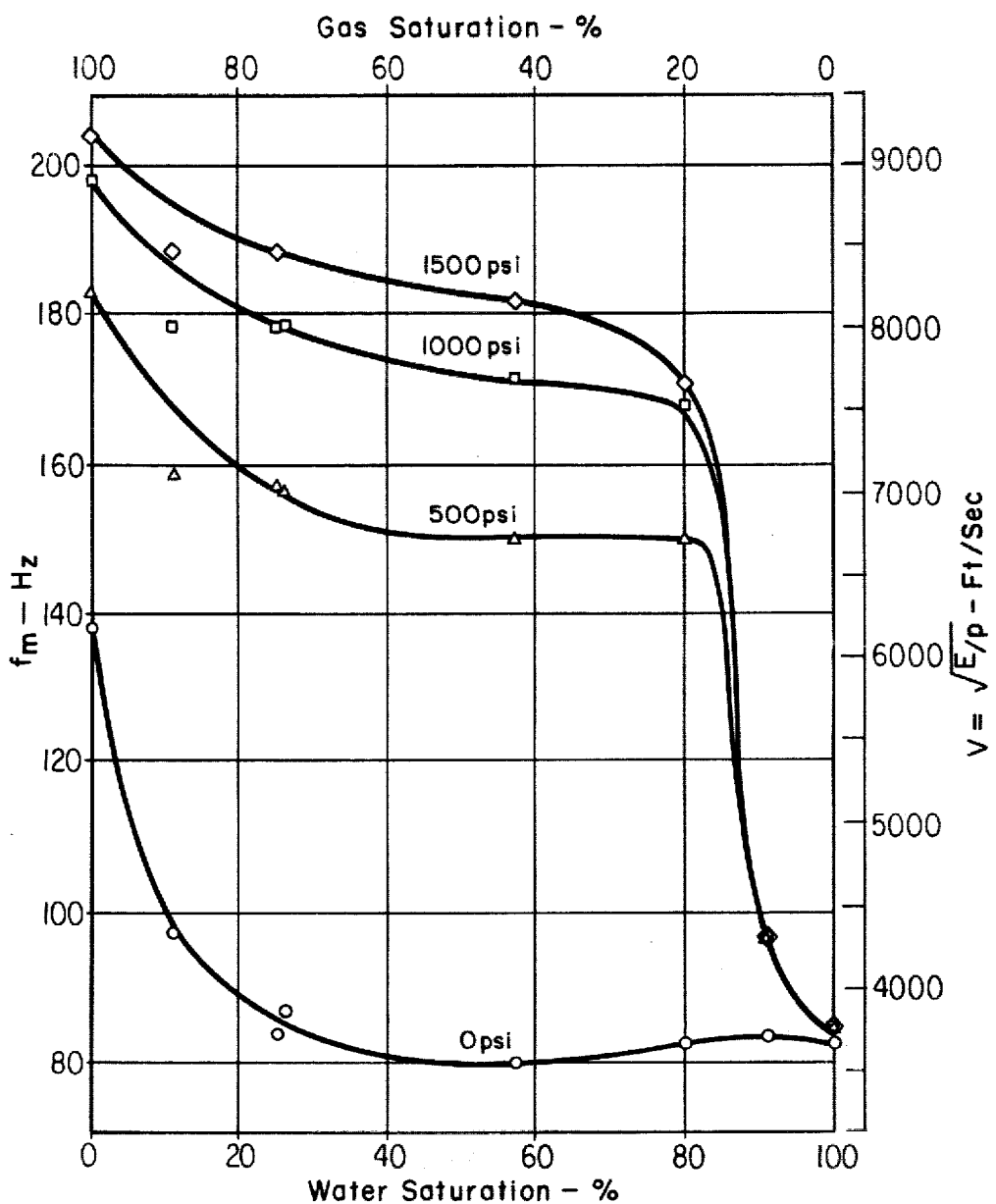
FIG. 1 is a plot of resonant frequency together with the corresponding bar velocity vs water and gas saturation of Berea sandstone cores from 0 psi to 1000 psi confining pressure.

This invention is directed to a method of logging a wellbore that penetrates a hydrocarbon-bearing formation and more particularly is directed to a method of distinguishing gas, oil and water zones in a hydrocarbon-bearing formation which is characterized by an acoustic velocity profile which exhibits a maximum velocity in those zones thereof having a maximum oil concentration, an intermediate acoustic velocity in those zones having a high gas concentration and a minimum acoustic velocity in those zones having a high water concentration not exceeding 90% water saturation.

Laboratory studies have been carried out concerning the acoustic velocities of cores taken from subsurface formations penetrated by wellbores. These studies have shown that the addition of water or oil to gas saturated rock causes large changes in bar velocity in certain types of sandstones. They also show that the bar velocity is close to the p-wave velocity for liquid saturations below 90%. These effects are not observed in limestones.

It has been found that the general acoustic characteristics of many sandstones are similar to that of Berea sandstone. Spring-mass resonance measurements have been carried out on Berea sandstone cores using bar lengths between 10 and 30 cm., bar diameters between 0.9 and 2.0 cm. and masses between 2000 and 20,000 g.

Measurements of resonant frequencies have been used to compute Youngs Modulus bar velocity. The latter is the velocity a wave would have travelling through a thin prismatic bar of Berea sand provided it behaved like a perfectly elastic material. For small values of Poisson Ratio the bar velocity can be taken, as a first approximation, to be equal to the p-wave velocity in the rock material. In most sands the Poisson Ratio is small. Bar velocities computed from Berea resonance measurements are compiled in TABLE 1 below.

TABLE I

SPRING-MASS RESONANCE MEASUREMENTS BEREA SANDSTONE

Bar Length = 13.5 cm.
Bar Diameter = .889 cm.
Mass = 5885 g.

| Saturation Conditions | Resonant Frequency (Hz) | Computed Bar Velocity (Ft/Sec) |
| --- | --- | --- |
| 50% Gas/50% Water | 111.7 | 3990 |
| 100% Gas | 162.0 | 5800 |
| 50% Gas/50% Oil | 202.0 | 7200 |

There it is seen that completely dry, unconfined Berea samples give bar velocities of about 6000 feet per second. The addition of water to the dry samples reduces this velocity to about 3800 feet per second and the addition of a light oil (viscosity of 0.7 cp.) produces little change. The addition of a heavier oil (viscosity of 60 cp.) increases the velocity to about 7200 feet per second. These data show that an almost twofold change in bar velocity occurs between gas/water and gas/oil saturation provided the oil is a heavy oil. We can expect similar changes in the p-wave velocity measured by logging tools at low frequency. Increased confining pressure produces a general increase in bar velocity. It also reduces the velocity separations associated with differences in gas, water and oil saturations. This is illustrated for gas-water saturations in FIG. 1. The effect of confining pressure causes the bar velocity characteristics of sandstones of different saturation conditions to tend to disappear with depth.

Measurements of pulse travel times at ultrasonic frequency do not show the large velocity changes of FIG. 1. This is demonstrated by the work of A. R. Gregory, "Fluid Saturation Effects on Dynamic Elastic Properties of Sedimentary Rocks", Geophysics, Vol. 41, pp 895–913, (1976). Evidently the effects are limited to sonic frequencies for reasons that are not well understood. The actual upper frequency limits which could be used in a sonic logging tool in carrying out the present invention could be determined by conducting lab measurements.

Conventional logging methods often do not provide good estimates of gas, oil and water saturations in shallow reservoirs. This invention offers a new technique of logging shallow sandstone reservoirs to determine gas, oil and water saturations.

In accordance with this invention there is provided a method of logging a wellbore to identify the hydrocarbon and water zones of a hydrocarbon-bearing formation and more specifically to identify the gas, oil and water zones thereof. A shallow hydrocarbon-bearing formation is identified that has characteristic acoustic velocities that are maximum at high oil saturations, minimum at high water saturations, not exceeding 90% and intermediate at high gas saturations. Thereafter the well is logged adjacent the hydrocarbon-bearing formation with a sonic logging system utilizing a frequency within the range of about 0.1 to 10 KHz to produce a sonic log. The well is also logged adjacent the hydrocarbon-bearing formation with a lithologic logging system to determine the porosity and lithologic variations of the formation whereby the sonic log may be normalized by correcting for porosity and lithology. The sonic log is then compared with the characterized acoustic velocity of the hydrocarbon-bearing formation to identify the hydrocarbon and water zones thereof.

Suitable lithologic logging systems for use in carrying out this invention are density and gamma logging systems.

The identification of the hydrocarbon-bearing formation by acoustic velocity characteristic may be done by obtaining cores from at least one wellbore that penetrates the hydrocarbon-bearing formation and conducting laboratory resonance measurements.

By conducting the laboratory resonance measurements on cores having high gas saturations, high oil saturations, and high water saturations, the hydrocarbon-bearing formation may be characterized by the bar velocity of the gas zone, the oil zone, and the water zone, such that the sonic log may be compared against these acoustic velocity characteristics to identify the gas and oil zones as well as the water zone. Further measurements may be made at different oil, gas and water saturations to produce a more complete acoustic velocity profile of the formation from which the cores were taken.

Suitable laboratory measurement techniques for characterizing the hydrocarbon-bearing formation by acoustic velocity include spring-mass resonance methods and bar resonance methods. Reference is made to G.H.F. Gardner, "Effects of Pressure & Fluid Saturation on the Attenuation of Elastic Waves in Sands" Jour. Pet. Tech. Feb. 1964, pp. 189–198 for description of the bar resonance method.

With reference again to FIG. 1 there are shown plots of bar velocity versus gas and water saturation at 0 psi, 500 psi, and 1000 psi, confining pressure. These plots show that the bar velocity of the Berea sandstone increases with increasing gas saturation in the range above 70% gas. At increasing gas concentrations from 20% it is seen that the increase in bar velocity with increasing gas saturation is most pronounced at 0 psi confining pressure and diminishes with increasing confining pressure. The same trends should be observed in low frequency p-wave velocities measured by a logging tool. Thus, FIG. 1 illustrates that the method of this invention is particularly applicable for distinguishing hydrocarbon zones in shallow subsurface formations. It is seen that the increase in bar velocity with increasing gas saturation at 1000 psi is clearly sufficiently pronounced to identify gas from water zones. It is considered that this invention is applicable for logging formations at depths of at least 3000 to 5000 feet and possibly deeper. As previously noted there is a particular need for a technique which can distinguish gas, oil and water zones in shallow formations. The present invention provides such a technique.

Figure 2:
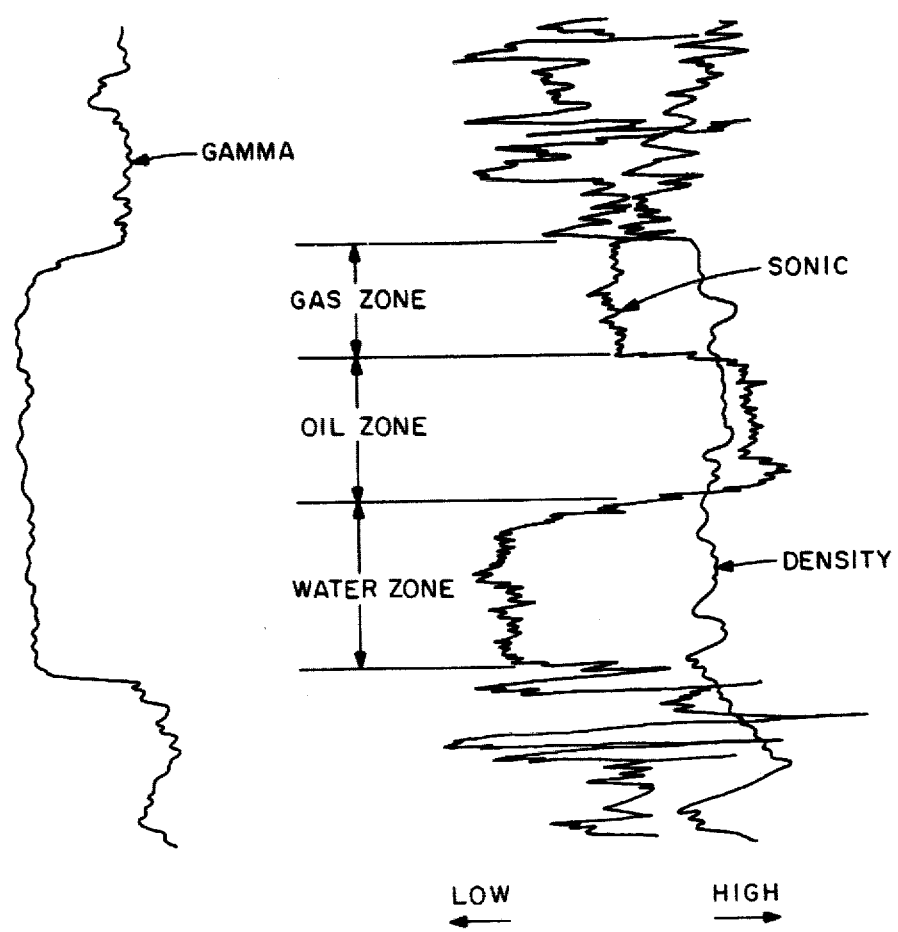
FIG. 2 illustrates hypothetical Gamma, Density and Sonic logs.

With reference to FIG. 2 there is shown a hypothetical series of logs, namely gamma, sonic and density logs which have been run adjacent a hydrocarbon-bearing formation containing a gas zone, an oil zone, and a water zone. The gamma and density logs show no big variations in the porosity of the hydrocarbon-bearing formation. Thus there is no need to normalize the sonic log to correct for porosity changes in the formation. Such techniques for normalizing a sonic log are readily available, however, should a need exist. An examination of the sonic log shows three distinct acoustic velocities adjacent the hydrocarbon-bearing formation. By comparing the acoustic velocity of the formation as represented by the sonic log against the characteristic acoustic velocities of the formation being logged as illustrated by TABLE I, one can identify the gas zone as having the intermediate acoustic velocity, the oil zone as having the maximum acoustic velocity, and the water zone as having the minimum acoustic velocity.

What is claimed is:

1. A method for determining oil/water and gas/oil interfaces in subsurface formations comprising the steps of:
   analyzing well bore formations to determine a hydrocarbon bearing formation having acoustic velocities that are maximum at high oil saturations, minimum at high water saturations and intermediate at high gas saturations to set predetermined acoustic velocity limits for water saturations, oil saturations and gas saturations;
   logging said hydrocarbon-bearing formations with a sonic logging system utilizing a frequency within the range of approximately 0.1 to 2 Kz to produce a sonic log having zones of different acoustic velocities;
   identifying zones on said sonic log as hydrocarbon-bearing whenever said sonic log acoustic velocity exceeds said predetermined acoustic velocity limit for water saturations and identifying zones on said sonic log as oil bearing whenever said sonic log acoustic velocity exceeds said predetermined acoustic velocity limit for gas saturations.

2. The method of claim 1, wherein the method of analyzing wellbore formations includes obtaining cores from at least one wellbore that penetrates said hydrocarbon-bearing formation and conducting laboratory resonance measurements thereon to characterize said formation by the acoustic velocity thereof at selected gas, oil and water saturations.

3. The method according to claim 1 also including the steps of:
   logging said hydrocarbon-bearing formation with a lithologic logging system to determine the porosity and lithologic variations of said formation to correct said sonic log for porosity and lithology; and
   comparing said lithologic log with a lithologic log of a formation having a core sample.